(12) United States Patent
Wang et al.

(10) Patent No.: US 9,261,862 B2
(45) Date of Patent: *Feb. 16, 2016

(54) AUTOMATION MANAGEMENT SYSTEM AND METHOD

(71) Applicant: BEET, LLC, Plymouth, MI (US)

(72) Inventors: David Wang, Northville, MI (US); Daisy Red, Royal Oak, MI (US); Ivan Nausley, Dearborn, MI (US)

(73) Assignee: BEET LLC, Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/492,275

(22) Filed: Sep. 22, 2014

(65) Prior Publication Data

US 2015/0012121 A1   Jan. 8, 2015

Related U.S. Application Data

(63) Continuation of application No. 12/954,747, filed on Nov. 26, 2010, now Pat. No. 8,843,221.

(60) Provisional application No. 61/267,940, filed on Dec. 9, 2009.

(51) Int. Cl.
| | |
|---|---|
| *G05B 9/02* | (2006.01) |
| *G06F 11/30* | (2006.01) |
| *G05B 23/02* | (2006.01) |
| *G06N 5/04* | (2006.01) |

(52) U.S. Cl.
CPC .............. *G05B 9/02* (2013.01); *G05B 23/0232* (2013.01); *G06N 5/04* (2013.01)

(58) Field of Classification Search
None
See application file for complete search history.

(56) References Cited

U.S. PATENT DOCUMENTS

| | | | | |
|---|---|---|---|---|
| 6,665,581 | B2 * | 12/2003 | Nishida et al. | 700/204 |
| 7,039,484 | B2 * | 5/2006 | Daferner | 700/108 |
| 8,843,221 | B2 * | 9/2014 | Wang et al. | 700/79 |

* cited by examiner

*Primary Examiner* — Sean Shechtman
(74) *Attorney, Agent, or Firm* — Quinn Law Group, PLLC

(57) ABSTRACT

Disclosed herein is a method for monitoring performance of equipment located in an automation environment including identifying a sequence of tasks performed by the equipment, wherein each task in the sequence is defined by a series of signals; for each task in the sequence: (a) collecting data pertaining to the series of signals; (b) determining a completion time based on the collected data; and (c) determining a difference between the determined completion time and a predetermined reference value indicative of an expected completion time; repeating (a)-(c) for a plurality of repetitions of the sequence; summing, over the plurality of repetitions of the sequence, at least some of the determined differences to calculate an accumulated variance value for each given task; and selectively generating a predictive failure indication based on the accumulated variance values.

20 Claims, 6 Drawing Sheets

AUTOMATION MANAGEMENT SYSTEM AND METHOD

CROSS REFERENCE TO RELATED APPLICATIONS

This application is a continuation if U.S. patent application Ser. No. 12/954,747 filed Nov. 26, 2010, which claims priority to U.S. Provisional Patent Application Ser. No. 61/267,940, filed Dec. 9, 2009, both of which are incorporated by reference herein in their entireties.

BACKGROUND

In industrial automation facilities, optimal operation of the facility can partially depend on the equipment monitoring system employed therein. Equipment monitoring systems can collect data from, for example, computational devices (programmable logic controllers, programmable automation controller, etc.) in equipment located throughout the facility. The collected data can assist in, for example, monitoring equipment health, predicting when equipment failure will occur and/or informing operators when equipment failure has occurred. A computer interface, such as a human-machine interface (HMI), may be interconnected with the computational devices to facilitate programming or control thereof, to monitor the computational device, or to provide other such functionality.

Current approaches of data collection include, for example, utilizing an interface (e.g. OPC server, open connectivity, server) with the HMI or other computer to poll data from the computational devices according to a preset time interval. Such an approach may be less than optimal since a large amount of data is collected and stored even when there may be no activity or change in information. Further, since many times the OPC server is configured based on the configuration of the computational device, modifications to the software present on the computational device can prevent accurate data collection.

Other current approaches of data collection include, for example, programming the computational device to transmit data upon detection of a problem using the common industrial protocol (CIP). Although less data will typically be collected and stored using this approach as compared to the above-described polling approach, this is largely a reactive system. Accordingly, for example, data is captured only if the computational device detects an error. Further, simply collecting this error data may not permit an operator to engage in playback (i.e. replicate equipment performance) because complete performance data may not be have been transmitted by the computational device.

SUMMARY

One aspect of the disclosed embodiments is a method for monitoring performance of equipment located in an automation environment including identifying a sequence of tasks performed by the equipment. Each task in the sequence is defined by a series of signals. For each task in the sequence, the method includes (a) collecting, using one or more processors, data pertaining to the series of signals; (b) determining a completion time based on the collected data using the one or more processors; and (c) determining, using the one or more processors, a difference between the determined completion time and a predetermined reference value indicative of an expected completion time. The method also includes repeating (a)-(c) for a plurality of repetitions of the sequence. Further, the method includes summing, over the plurality of repetitions of the sequence and using the one or more processors, at least some of the determined differences to calculate an accumulated variance value for each given task and selectively generating a predictive failure indication based on the accumulated variance values.

Another aspect of the disclosed embodiments is an apparatus for monitoring performance of equipment located in an automation environment including a memory and a processor configured to execute instructions stored in the memory to identify a sequence of tasks performed by the equipment. Each task in the sequence is defined by a series of signals. For each task in the sequence, the processor is configured to execute instructions stored in the memory to (a) collect data pertaining to the series of signals; (b) determine a completion time based on the collected data; and (c) determine a difference between the determined completion time and a predetermined reference value indicative of an expected completion time. The processor is also configured to execute instructions stored in the memory to repeat (a)-(c) for a plurality of repetitions of the sequence. Further, the processor is also configured to execute instructions stored in the memory sum, over the plurality of repetitions of the sequence, at least some of the determined differences to calculate an accumulated variance value for each given task and selectively generate a predictive failure indication based on the accumulated variance values.

Another aspect of the disclosed embodiments is a method for monitoring performance of equipment located in an automation environment including identifying a sequence of tasks performed by the equipment, wherein each task in the sequence is defined by a series of signals. For each task in the sequence, the method includes (a) collecting data pertaining to the series of signals using one or more processors; (b) determining a completion time based on the collected data using the one or more processors; and (c) comparing, using the one or more processors, the determined completion time and a predetermined reference value indicative of an expected completion time. The method also includes repeating (a)-(c) for a plurality of repetitions of the sequence. Further, the method includes generating, over the plurality of repetitions of the sequence and using the one or more processors, an accumulated variance value for each given task based on at least some of the comparisons; and detecting a trend based on the accumulated variance values.

These and other embodiments are disclosed in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
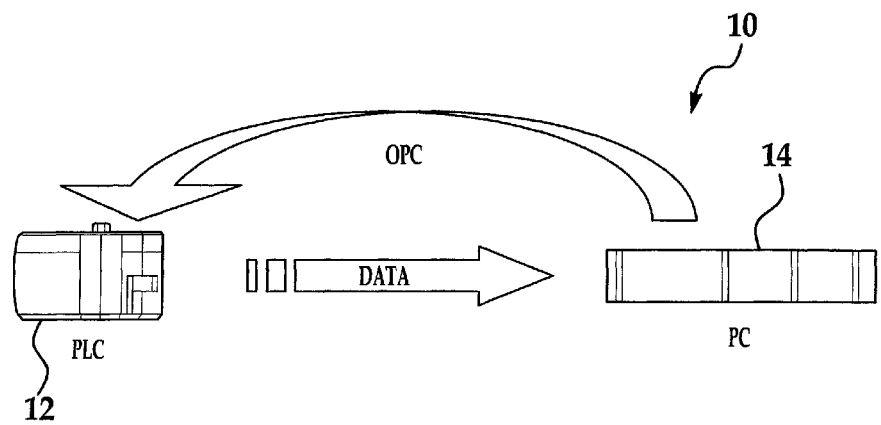
FIG. 1 is schematic diagram of an automation management system according to one embodiment of the present invention.

Referring to FIG. 1, an automation management system 10 includes a PLC 12 and a PC 14. The data that is collected from the PLC 12 can be based on, for example, the programming of the PLC 12, as will be discussed in more detail below. PC 14 can include a data access server, such as an OPC (OLE, Object Linking and Embedding, for Process Control) server, to retrieve data from PLC 12 and to convert the hardware communication protocol used by PLC 12 into the server protocol (e.g. OPC protocol). Although in this embodiment, the data access server is, by way of example, an OPC server other suitable data access servers are available having custom and/or standardized data formats/protocols. The data retrieved by the OPC server can optionally be stored in a database (not shown).

Both PLC 12 and PC 14 can have suitable components such as a processor, memory, input/output modules, and programming instructions loaded thereon as desired or required. PLC 12 and PC 14 can be in transmit/receive data through a wired or wireless communication protocol such as RS232, Ethernet, SCADA (Supervisory Control and Data Acquisition). Other suitable communication protocols are available.

Although one PLC 12 is illustrated in FIG. 1, more than one PLC 12 may be in communication with PC 14, or other PCs. PLC 12 can be connected to and control any equipment including machines such as clamps or drills. To ease the reader's understanding of the embodiments, the description will refer to machines although the embodiments can be used with equipment other than the machines.

The machines can be part of any system including but non-limited to machining, packaging, automated assembly or material handling. PLC 12 is not limited to being connected to a machine and/or can be connected to any other suitable device. Other devices may be used in lieu or in addition to PLC 12 such as PACs (Process Automation Controllers) or DCS (Distributed Control Systems) or any other suitable computational device.

The PC 14 can also include a client application to obtain the data from or send commands to PLC 12 through the OPC server. Also, in other embodiments, the client application can be connected to several OPC servers or two or more OPC servers can be connected to share data. Further, for example, PC 14 can include a graphical display representing information such as the status of the machines on the plant floor. In other embodiments, the HMI can also be located as a separate device from the PC 14.

Any other device can be used in lieu of or in addition to PC 14. For example, some non-limiting examples include Personal Digital Assistants (PDAs), hand held computers, palm top computers, smart phones, game consoles or any other information processing devices.

It is noted that the architecture depicted in FIG. 1 and related description is merely an example and the automation management system 10 described herein can be used with virtually any architecture. For example, modules (e.g. OPC server, client application, etc.) can be distributed across one or more hardware components as desired or required.

One use of PLC 12 is to take a machine through a repetitive sequence of one or more operations or tasks. The completion of the repetitive sequence of tasks can be denoted as a cycle. Each task can have, for example, an optimal design start time and design end time in the sequence and resulting duration time ("reference values"). These optimal design times can be based on, for example, the manufacturer's specification or an equipment user's study of when and how long a certain tasks should be executed. The design times can be determined by any other method.

Figure 2:
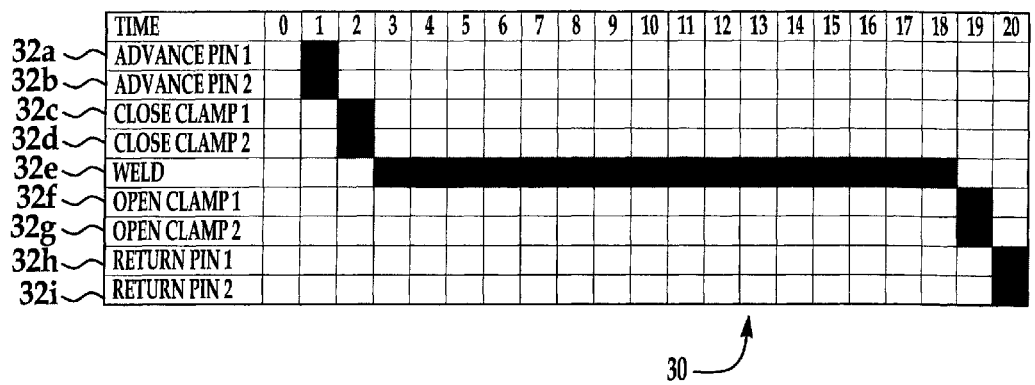
FIG. 2 is a timing diagram of an exemplary design cycle as used in the automation management system of FIG. 1.

Referring to FIG. 2, an exemplary design cycle 30 is illustrated from time t1-t20. The design cycle includes nine tasks 32a-i (collectively referred to as tasks 32). During development, each task 32 is designed to begin operation at a specific start time and designed to end operation at a specific end time. When PLC 12 is operating, PLC 12 can be programmed to collect this start time and end time information and made available to PC 14. For example, the start time and end time information can be sent to PC 14 or PC 14 can periodically poll PLC 12. Accordingly, rather than collecting unnecessary information from PLC 12 (e.g. downtime data), PLC 12 can collect and transmit information that can be used to appropriately monitor and determine a reactive, preventive and/or predictive plan for the machine(s) being controlled. This information can be sent at the end of the cycle 30, during the cycle 30 upon request by the PC 14 or at any other time as desired or required. Thus, as illustrated for cycle 30, advance pin 1 task 32a starts at t0 and ends at t1 and has a duration of t1-t0, advance pin 2 task 32b starts at t0 and ends at t1 and has a duration of t1-t0, close clamp 1 task 32c starts at t1 and ends at t2 and has a duration of t2-t1, close clamp 2 task 32d starts at t1 and ends at t2 and has a duration of t2-t1, weld task 32e starts at t2 and ends at t18 and has a duration of t18-t2, open clamp 1 task 32f starts at t18 and ends at t19 and has a duration of t19-t18, open clamp 2 task 32g starts at t18 and ends at t19 and has a duration of t1-t18, return pin 1 task 32h starts at t19 and ends at t20 and has a duration of t20-t19 and return pin 2 task 32i starts at t19 and ends at t20 and has a duration of t20-t19. This cycle is merely exemplary, and other design cycles are available with different types of tasks, different numbers of tasks and different start and end times for the tasks.

PLC 12 generally receives input data, output data and/or other data ("series of signals") from the machines they control. Each task 32 can be defined as a series of one or more input and/or output states. The tasks 32 can be defined, for example, by a programmer during software development for the PLC 12. Thus, for example, PLC 12 can determine whether advance pin 1 task 32a has been complete by examining whether certain inputs and/or outputs or any other condition (e.g. timer) are set to their correct states or values. It is to be understood that the term "states" does not limit embodiments of the invention to digital input and/or signals. In other embodiments, analog inputs or outputs, or a combination of digital and analog inputs or outputs, can be collected from the machines and can be used to define each task 32.

Figure 3A:
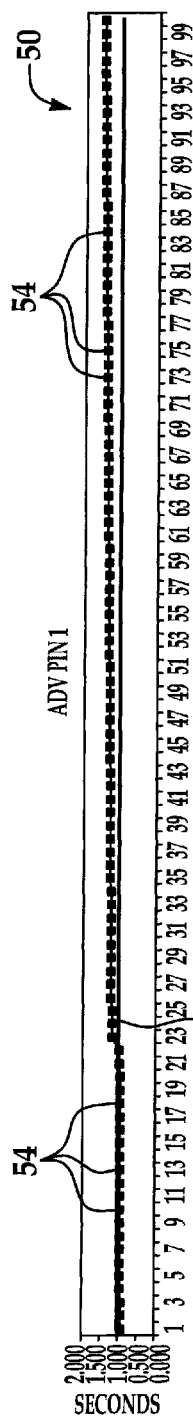
FIGS. 3A-3D are performance diagrams of exemplary actions of the exemplary cycle of FIG. 2.

Referring to FIGS. 3A-3D, exemplary performance graphs 50, 60, 70 and 80 of task 32a, task 32b, task 32c and tasks 32d are shown, respectively, over one hundred cycles. As illustrated in FIG. 3A, advance pin 1 task 32a is designed to complete its operation within, for example, one second, as indicated by base line 52. The actual operation advance pin 1 task 32a is indicated by a series of plot points 54. Each plot point 54 can represent the actual completion time or duration ("timing value") for task 32a during that particular cycle. As can be seen from the performance graph, the completion time of task 32a is gradually increasing. This can, for example, provide notice to a user that an input and/or an output associated with task 32a is or may in the future experiencing a failure. Accordingly, if desired or required, appropriate maintenance procedures can be undertaken. Although the timing value illustrated in FIGS. 3A-3D, other timing values are available in lieu of or in addition to duration. For example, other timing values include a start time or end time for the task.

Similar to that described above in connection with reference to performance graphs 50, advance pin 2 task 32b is designed to complete its operation within one second, as indicated by base line 62 and the actual operation of task 32b is indicated by a series of plot points 64. Close clamp 1 task 32c is designed to complete its operation within one second, as indicated by base line 72 and the actual operation of task 32c is indicated by a series of plot points 74. Close clamp 2 task 32d is designed to complete its operation within one second, as indicated by base line 82 and the actual operation of task 32d is indicated by a series of plot points 84. Since the series of plots points 64, 74 and 84 do not, for example, consistently deviate from the base lines 62, 72 and 82, the user(s) can, for example, ascertain that the tasks are 32b-d are operating normally.

As stated above, the performance graphs 50, 60, 70 and 80 are merely exemplary. Other performance graphs may contain other data, depicted using another graph type, or combined into one graph. Further, although 100 cycles are shown, performance graphs can contain any number of cycles.

Figure 4A:
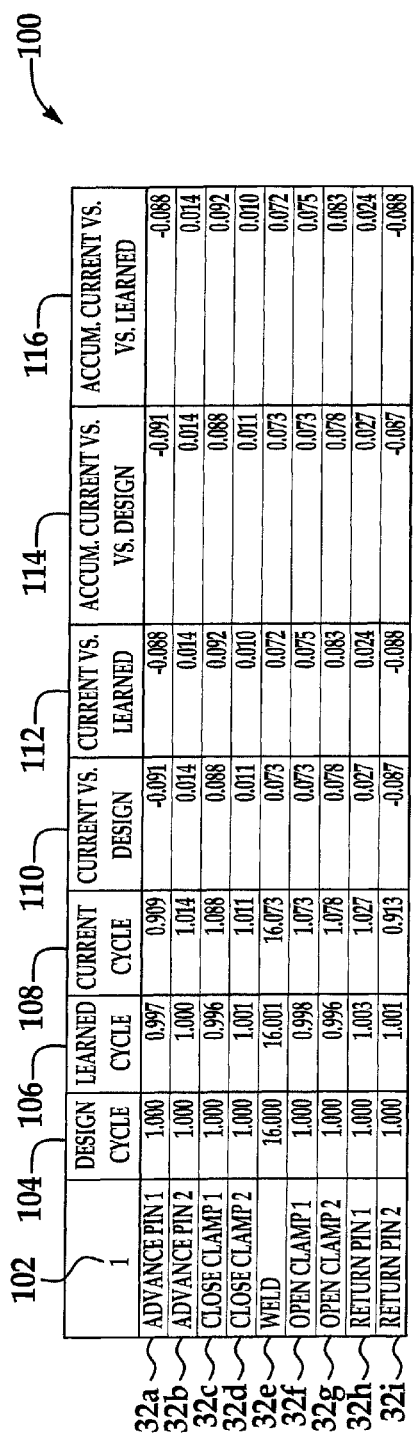
FIG. 4A is a performance data diagram for a cycle as used in the automation management system of FIG. 1.
Figures 5A, 5B:
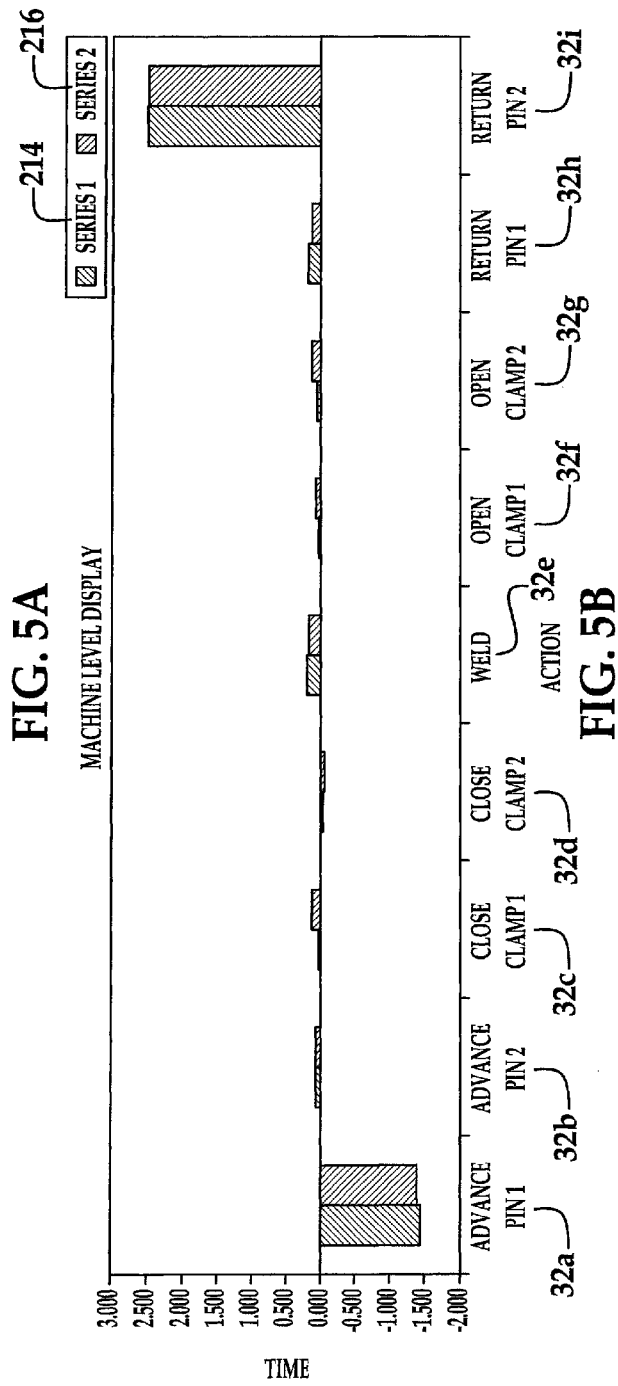
FIG. 5A is a performance data diagram for another cycle as used in the automation management system of FIG. 1.
FIG. 5B is a machine level performance diagram using the cycle performance data of FIG. 4A.
Figures 6A, 6B:
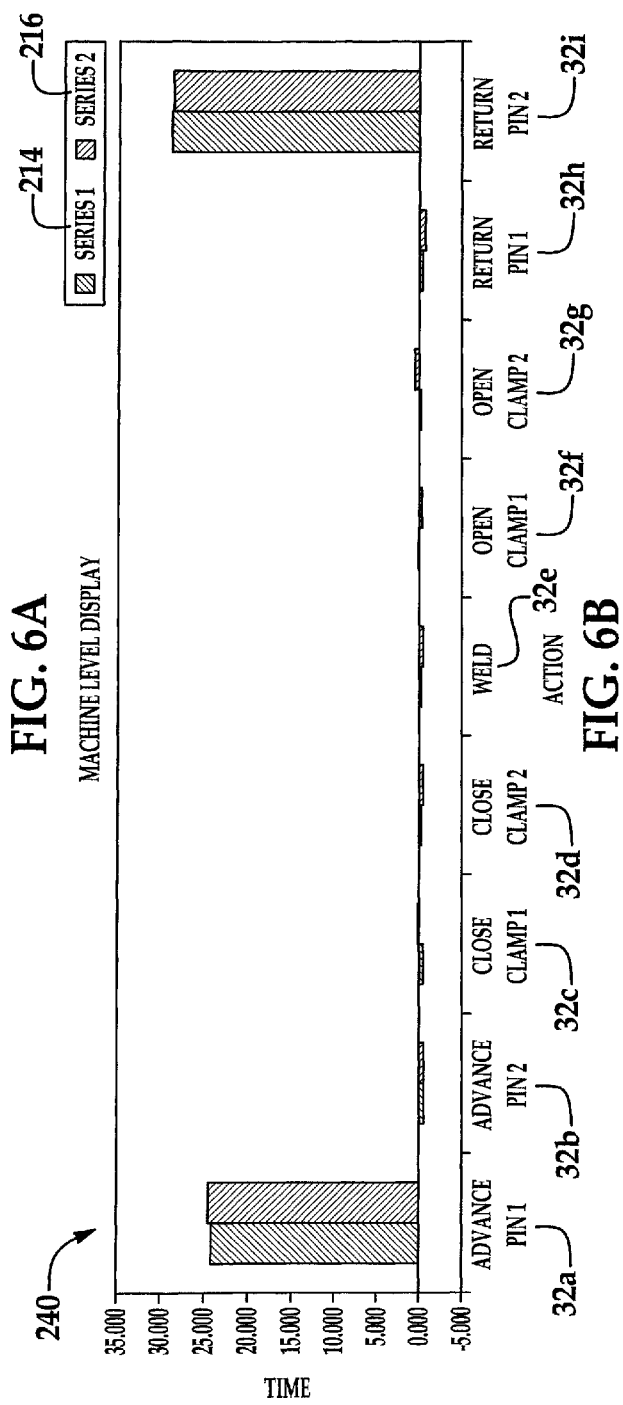
FIG. 6A is a performance data diagram for another cycle as used in the automation management system of FIG. 1.
FIG. 6B is a machine level performance diagram using the cycle performance data of FIG. 4A.

Referring to FIGS. 4A, 5A and 6A are performance data diagrams 100, 120 and 140, respectively. The performance data diagram 100 includes information for a first cycle 102, the performance data diagram 120 includes information for a twentieth cycle 122 and performance data diagram 140 includes information for a hundredth cycle 142. It is to be understood that these cycles are selected from the 100 cycles previously shown but are in no way intended to limit the scope of the embodiments disclosed herein. Rather, selection of these cycles is intended to assist the reader's understanding of embodiments. Other cycles can contain different data.

The cycles 102, 122 and 142, as discussed previously, can include tasks 32. For each task 32, performance data can include design cycle data 104, learned cycle data 106, current cycle data 108 ("timing value"), current versus design cycle data 110, current versus learned cycle data 112, accumulated current versus design cycle data 114 and accumulated current versus learned cycle data 114.

Design cycle data 104 can include data pertaining to design times for the certain machine performing the tasks and is not based on the series of signals collected from the particular machine being monitored. Thus, as discussed previously, each task may have an expected start time, end time and duration based on for example, a manufacturer's specification or as set by a user. For example, if a manufacturer's specification indicates that the weld task 32e should be performed in 16 seconds, the design cycle time can be 16 seconds. Design cycle times 104 can be determined by other methods. The design cycle times 104 are preferably the same throughout the execution of the tasks 32, although in some embodiments the design cycle can change.

Learned cycle time 106 can include data pertaining to a reference time for a certain machine. In other words, learned cycle time 106 is a reference value based on the series of signals collected from the machine. For example, a user can cause the machine to execute a cycle of tasks 32a-i, in order to teach the system the reference data for that particular machine. These learned cycle times can be recorded, for example, during setup of the machine, maintenance of the machine or at any other suitable time. Once the machine has the design cycle time 104 and the learned cycle time 106, the machine can begin operation and can begin collecting current cycle times for each task 32. Current cycle time 108 can be the duration of the time needed to complete each task (i.e. difference between start time and end time). Thus, for example, as shown in FIG. 4A, during the first cycle 102, the welding process lasted 16.073 seconds. During the twentieth cycle 122, the welding process lasted 15.987 seconds. During the hundredth cycle 142, the welding process lasted 15.937 seconds. As discussed previously, the start time and end time and/or the duration for each task 32, can be collected and sent to the PC 14.

Once the current cycle times 108 have been collected, the current versus design time can be calculated for each task 32. Current versus design time 110 can be the difference between the design cycle times 104 and the current cycle times 108. Similarly, current versus learned time 112 can be the difference between the learned cycle times 106 and the current cycle times 108. The current versus design time 110 and current versus learned time 112 calculations can be made by PC 14 or by any other module. For example, if the HMI is a separate module than the PC 14, the HMI can perform the calculations.

Once the current versus design time 110 has been calculated, a determination can be made as to whether the task 32 has been executed within a threshold value. Thus, for example, if the current versus design time 110 is less than or equal to 10% of the design cycle time 104, then the current cycle has been executed within the acceptable threshold value. The acceptable threshold can indicate that the task is operating normally and a normal operation indicator can be generated (e.g. at PC 14) as will be discussed in more detail below. If the current versus design time 110 is between 10% and 25% of the design cycle time 104, then the current cycle has been executed within a cautionary threshold. The cautionary threshold can indicate that an action may be needed on some input or output associated with that certain task. Similar to the normal operation indicator, a cautionary indicator can be generated that indicates that the current cycle is within the cautionary threshold. If the current versus design time 110 is greater than 25% of the design cycle time 104, then the current cycle has been executed within a warning threshold. The warning threshold can indicate that an action may be needed on some input or output associated with that certain task and a warning indicator can be generated as will be discussed in more detail below. In other embodiments, any number of threshold ranges can be used with different range values. Further, in other embodiments, the current versus learned time 112 instead of the current versus design time 110 can be used to determine whether the task 32 is operating within a predetermined threshold. Other embodiments may contain different calculations to ascertain whether the execution time of the tasks is acceptable. For example, rather than using the design cycle time 104, the learned cycle time can be used to ascertain whether the task has been executed within an acceptable threshold.

Once a determination has been made in regard to whether the task 32 has been executed within an acceptable threshold for a particular cycle, this information can be displayed to the user(s). For example, if the tasks 32 have been executed in the acceptable threshold, that particular task can be highlighted, for example, in green ("normal operation indicator"). Similarly, for example, if the tasks 32 have been executed within the cautionary threshold, that particular task can be highlighted in yellow ("cautionary indicator") and if the tasks 32 have been executed within the warning threshold, that particular task can be highlighted in red ("warning indicator"). In other embodiment, the indicators are audible rather than visually displayed to the user. Other techniques for generating indicators are also available.

Referring to FIG. 4A, for example, all tasks 32*a-i* have been executed in the acceptable threshold. Referring to FIG. 5A, for example, tasks 32*a-h* have been executed in the acceptable threshold and task 32*i* has been executed within the cautionary threshold. Referring to FIG. 6A, tasks 32*b-h* have been executed within the acceptable threshold and tasks 32*a* and 32*i* have been executed within the warning threshold.

Once the current versus design times 110 have been calculated, the accumulated current versus design time 114 ("accumulated variance value") can be calculated for each task 32. The accumulated current versus design time 114 can be the running total or the sum of the current versus design time 110 across some or all cycles (e.g. 100 cycles) for a particular machine run. The machine run may be terminated based on, for example, user(s) intervention, machine breakdown etc. Similarly, once the current versus learned times 106 have been calculated, the accumulated current versus learned time 116 ("accumulated variance value") can be calculated for each task 32. Again, the accumulated current versus design time 116 can be the running total or sum of the current versus learned time 116 across all cycles (e.g. 100 cycles) for a particular machine run. The accumulated current versus learned time 114 and the accumulated current versus design time 116 can be calculated at PC 14, or on any other computational device (e.g. PLC 12).

Figure 4B:
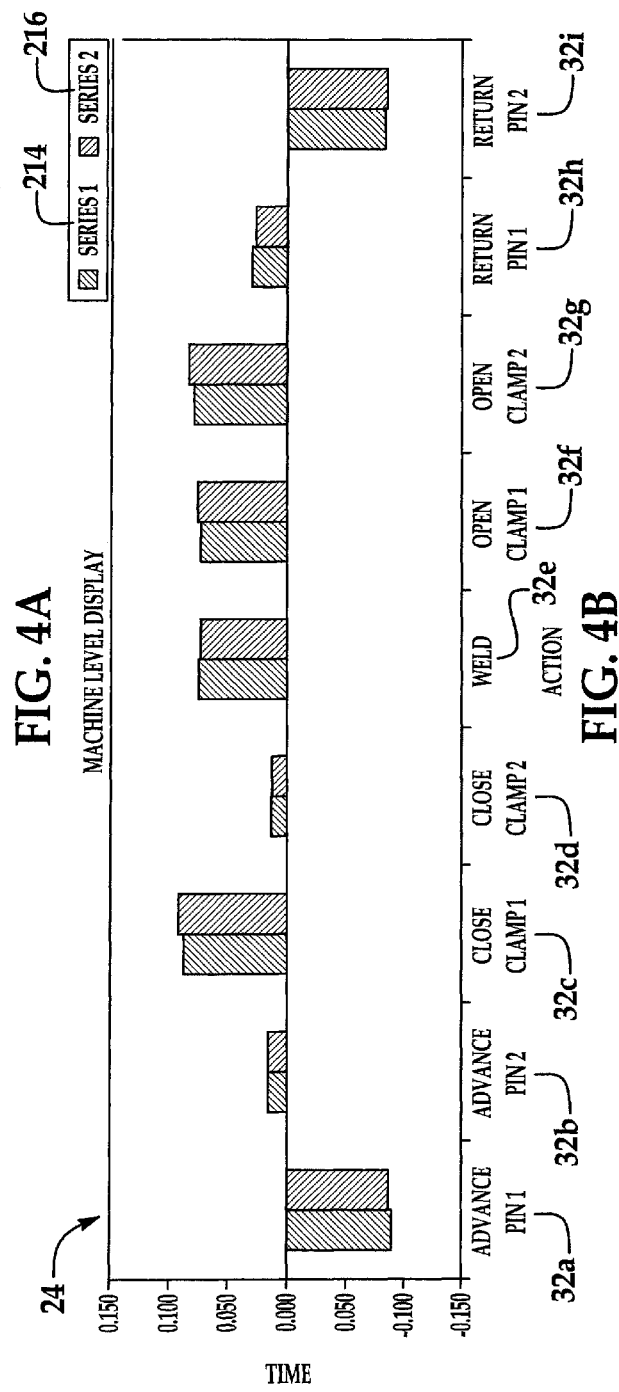
FIG. 4B is a machine level performance diagram using the cycle performance data of FIG. 4A.

Both the accumulated current versus design times 114 and the accumulated current versus learned times 116 can be graphed on a machine level performance diagram for each cycle and for each task 32 as shown in FIGS. 4B, 5B and 6B. Series1 214 represents the accumulated current versus design time 114 for each task 32 and Series2 216 represents the accumulated current versus learned time 116 for each task. The machine level performance can be displayed, for example, a HMI. As the accumulated current versus design time 114 and/or the accumulated current versus learned time 116 increase, it can alert the user(s) that the particular task may be experiencing a problem that may require an action. For example, as can be seen from FIG. 6B, task 32*a* has an accumulated current versus design time 114 of 24.356 seconds and an accumulated current versus learned time of 24.656 seconds, which may indicate that advance pin2 task 32*a* is experiencing a problem. A similar observation can be made in regard to return pin2 task 32*i*.

Figure 7:
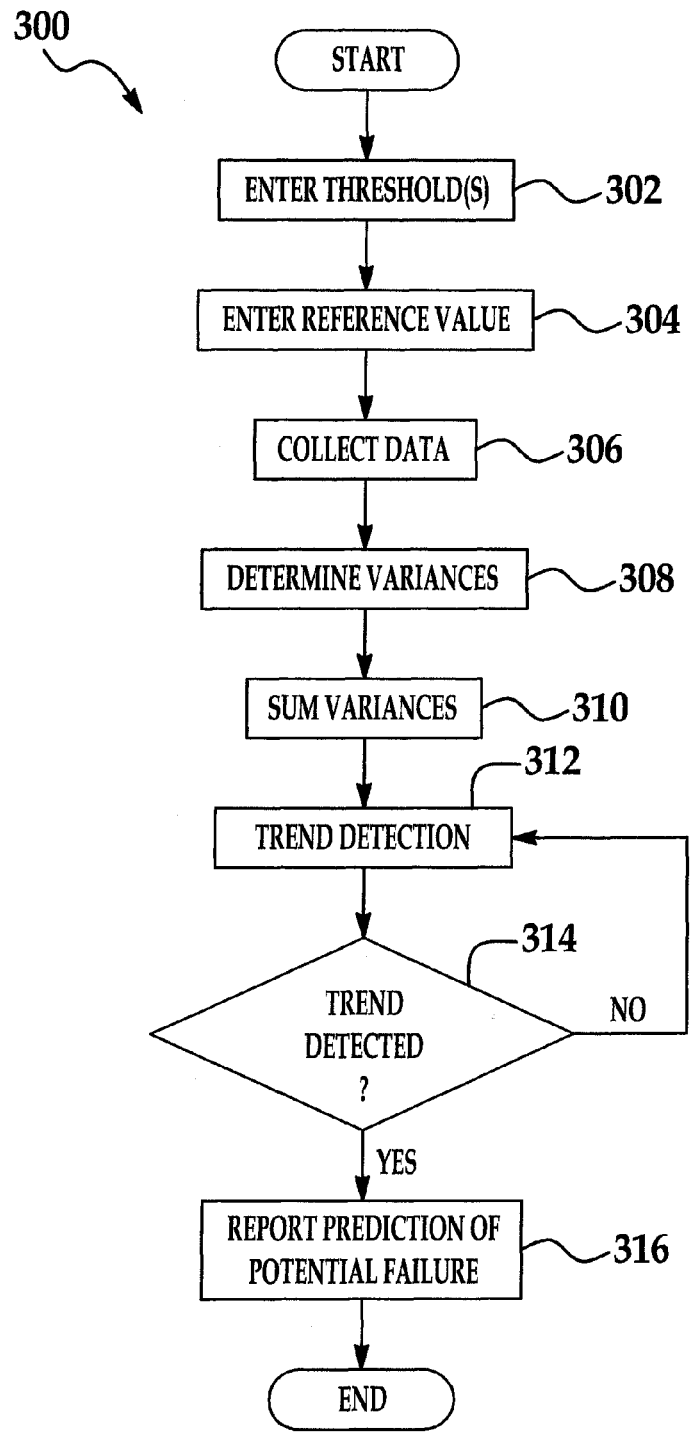
FIG. 7 is an exemplary flowchart diagram of a prediction routine used in the automation management system of FIG. 1.

FIG. 7 is a prediction routine 300 that can be used in automation management system 10. Beginning at block 302, a user enters one or more threshold values for at least one task. For example, a user enters one or more reference values (e.g. design cycle time 104) at block 304. Control then moves to block 306 to collect data or a series of signals from, for example, a machine being controlled PLC 12. PLC 12 can, in turn, send timing values to PC 14 related to the performance of one or more tasks (e.g. tasks 32*a-i*). In other embodiments, the series of signals can be collected directly from the machine being controlled.

At block 308, control moves to determine the variances or differences (e.g. current versus design time 110) between the reference value and one or more of the timing values collected from PLC 12 over a period of time. Design cycle data and/or learned cycle data can be used to determine the differences. The period of time may be any suitable value. As one example, the period of time is 2 seconds. At block 310, control moves to sum the variance to generate an accumulated variance value (e.g. accumulated current versus design time 114).

As the variances are being summed, control moves to block 312 to perform trend pattern detection to predict a potential failure of the machine. As one example, trend pattern detection determines a slope of the accumulated variance value. Control then moves to decision block 314 to determine if a pattern has been detected. A pattern can be detected if the slope of the accumulated variance value is either generally increasing or generally decreasing over the period of time rather than being generally constant. When the slope is generally constant, the accumulated variance value does not deviate significantly from zero. In other words, the value of the differences (determined at block 308) are at or close to zero.

Figure 3B:
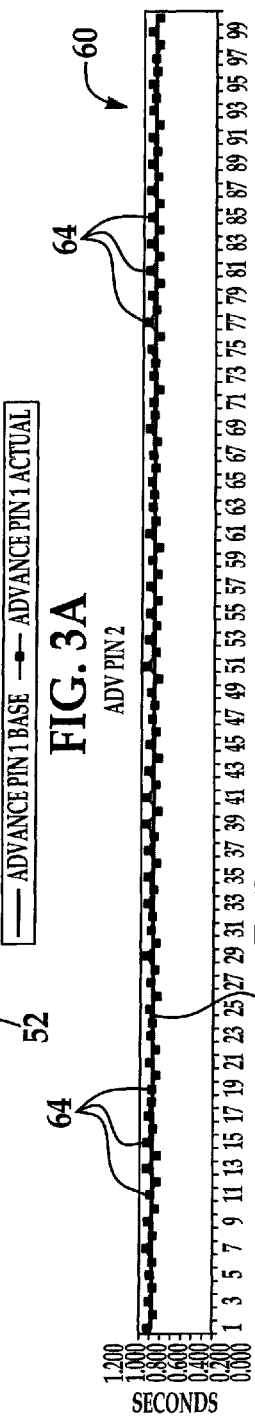
Figure 3C:
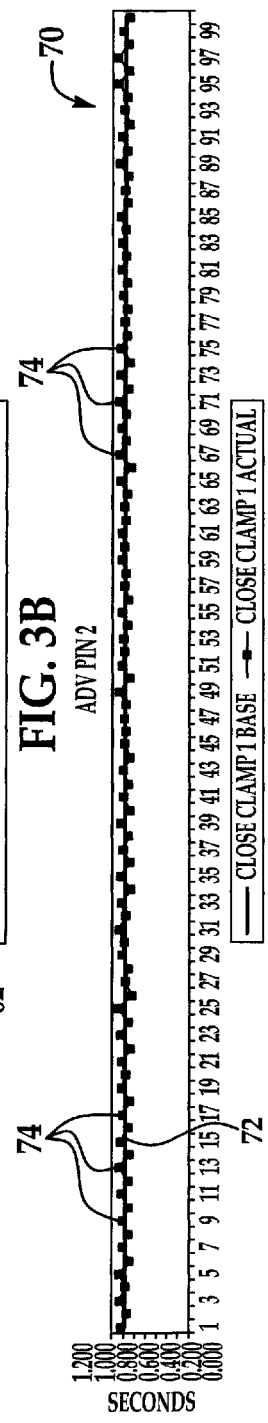
Figure 3D:
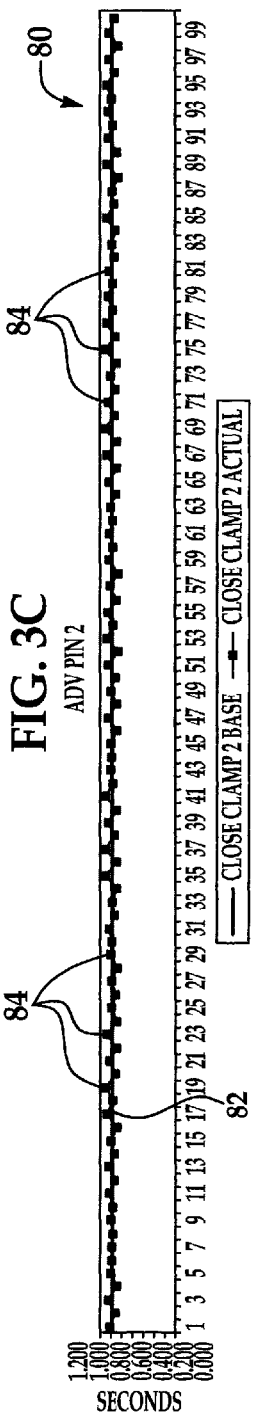

One example of a detected pattern, is shown in FIG. 3A where the slope of the accumulated variance value is illustrated as generally increasing. In contrast, FIGS. 3B-D show the slopes of their respective accumulated variance values as generally constant. Other suitable techniques of pattern detection are also available that do not include calculation of slope for the accumulated variance value If a pattern has been detected, control can move to step 316 to report the prediction of the potential failure. The prediction can be reported by generating the predictive failure indicator. Otherwise, if no pattern is detected (i.e. the slope is generally constant) the predictive failure indicator is not generated. The predictive failure indicator can be audible or visually displayed to the user at PC 14. Other suitable techniques for generating the predictive failure are also available.

The information collected from PLC 12 can be used in all aspects of reactive, predictive and preventive maintenance. In other embodiments, the operation of the tasks 32 can be monitored using any other statistical process control method or any other suitable method. Further, the information related to the executed tasks can be displayed in any other manner using control charts or any other suitable graphical display such as a Gantt chart.

Further, embodiments of the present invention are not limited to use in industrial factories, packaging plants etc. For example, embodiments of the present invention can be suitably incorporated into a monitoring and maintenance system of a rollercoaster or any other system that contains a computational device.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed:

1. A method for monitoring performance of equipment located in an automation environment, comprising:
   identifying a sequence of tasks performed by the equipment, wherein each task in the sequence is defined by a series of signals;
   for each task in the sequence:
   (a) collecting, using one or more processors, data pertaining to the series of signals;
   (b) determining a completion time based on the collected data using the one or more processors; and
   (c) determining, using the one or more processors, a difference between the determined completion time and a predetermined reference value indicative of an expected completion time;
   repeating (a)-(c) for a plurality of repetitions of the sequence;

summing, over the plurality of repetitions of the sequence and using the one or more processors, at least some of the determined differences to calculate an accumulated variance value for each given task; and selectively generating a predictive failure indication based on the accumulated variance values.

2. The method of claim 1, further comprising:
associating the one or more signals in the series to define a completion time for each of the plurality of tasks.

3. The method of claim 2, wherein the associating further comprises: identifying, for a given repetition, which of the one or more signals in the series correspond to a start time of a given task and which of the one or more signals in the series correspond to an end time of the given task; and
wherein the completion time for each task is based on a difference between the start and end times.

4. The method of claim 3, wherein the equipment includes a plurality of machines and wherein the start time of each of the tasks in the sequence is defined by the states of a first combination of one or more inputs or outputs of the plurality of machines and the end time of each of the tasks in the sequence is defined by the states of a second combination of one or more inputs or outputs of the plurality of machines.

5. The method of claim 1, further comprising:
if a predictive failure indication is generated, identifying which of the tasks in the sequence resulted in the predictive failure indication.

6. The method of claim 1, further comprising:
determining, for each of the of tasks, a slope of the accumulated variance values over a period of time.

7. The method of claim 6, wherein selectively generating the predictive failure indication further comprises:
if the slope is at least one of increasing or decreasing over the period of time, generating the predictive failure indicator; and
if the slope is substantially constant over the period of time, not generating the predictive failure indicator.

8. The method of claim 1, wherein the predictive failure indication is at least one of audible or visual.

9. The method of claim 1, wherein the series of signals are at least one of analog data or digital data.

10. An apparatus for monitoring performance of equipment located in an automation environment, comprising:
a memory; and
a processor configured to execute instructions stored in the memory to: identify a sequence of tasks performed by the equipment, wherein each task in the sequence is defined by a series of signals; for each task in the sequence:
(a) collect data pertaining to the series of signals;
(b) determine a completion time based on the collected data; and
(c) determine a difference between the determined completion time and a predetermined reference value indicative of an expected completion time;
repeat (a)-(c) for a plurality of repetitions of the sequence;
sum, over the plurality of repetitions of the sequence, at least some of the determined differences to calculate an accumulated variance value for each given task; and
selectively generate a predictive failure indication based on the accumulated variance values.

11. The apparatus of claim 10, wherein the processor is further configured to execute instructions stored in the memory to:
associate the one or more signals in the series to define a completion time for each of the plurality of tasks.

12. The apparatus of claim 11, wherein the processor is further configured to execute instructions stored in the memory to:
identify, for a given repetition, which of the one or more signals in the series correspond to a start time of a given task and which of the one or more signals in the series correspond to an end time of the given task; and
wherein the completion time for each task is based on a difference between the start and end times.

13. The apparatus of claim 12, wherein the equipment includes a plurality of machines and wherein the start time of each of the tasks in the sequence is defined by the states of a first combination of one or more inputs or outputs of the plurality of machines and the end time of each of the tasks in the sequence is defined by the states of a second combination of one or more inputs or outputs of the plurality of machines.

14. The apparatus of claim 10, wherein the processor is further configured to execute instructions stored in the memory to:
if a predictive failure indication is generated, identify which of the tasks in the sequence resulted in the predictive failure indication.

15. The apparatus of claim 10, wherein the processor is further configured to execute instructions stored in the memory to:
determine, for each of the of tasks, a slope of the accumulated variance values over a period of time.

16. The apparatus of claim 15, wherein the processor is further configured to execute instructions stored in the memory to:
if the slope is at least one of increasing or decreasing over the period of time, generate the predictive failure indicator; and
if the slope is substantially constant over the period of time, not generate the predictive failure indicator.

17. The apparatus of claim 10, wherein the predictive failure indication is at least one of audible or visual.

18. The apparatus of claim 10, wherein the series of signals are at least one of analog data or digital data.

19. A method for monitoring performance of equipment located in an automation environment, comprising:
identifying a sequence of tasks performed by the equipment, wherein each task in the sequence is defined by a series of one or more signals;
wherein the one or more signals is generated by the equipment;
for each task in the sequence:
(a) collecting data pertaining to the series of signals using one or more processors;
(b) determining a completion time based on the collected data using the one or more processors; and
(c) comparing, using the one or more processors, the determined completion time and a predetermined reference value indicative of an expected completion time;
repeating (a)-(c) for a plurality of repetitions of the sequence;
generating, over the plurality of repetitions of the sequence and using the one or more processors, an accumulated variance value for each given task based on at least some of the comparisons; and
detecting a trend based on the accumulated variance values;
wherein the accumulated variance value includes the total variance between the determined completion time and the predetermined reference value for the at least some of the comparisons.

20. The method of claim 19, wherein the repeating (a)-(c) for a plurality of repetitions of the sequence further comprises:
  identifying, for a given repetition, which of the one or more signals in the series correspond to a start time of a given task and which of the one or more signals in the series correspond to an end time of the given task;
  wherein the equipment includes a plurality of machines;
  wherein the completion time for each task is based on a difference between the start and end times; and
  wherein the start time of each of the tasks in the sequence is defined by the states of a first combination of one or more inputs or outputs of the plurality of machines and the end time of each of the tasks in the sequence is defined by the states of a second combination of one or more inputs or outputs of the plurality of machines.

* * * * *